United States Patent [19]

Steiger et al.

[11] 4,180,363

[45] Dec. 25, 1979

[54] ATTACHMENT DEVICE FOR A FORK LIFT

[76] Inventors: Douglass W. Steiger; Clifton E. Johnson, both of R.R. 2, Red Lake Falls, Minn. 56750

[21] Appl. No.: 891,495

[22] Filed: Mar. 30, 1978

[51] Int. Cl.[2] .................................................. B60P 1/64

[52] U.S. Cl. ...................................... 414/347; 414/498

[58] Field of Search ......................... 414/340, 347, 498

[56] References Cited

U.S. PATENT DOCUMENTS

| | | | |
|---|---|---|---|
| 3,390,797 | 7/1968 | Goodacre | 414/498 X |
| 3,710,965 | 1/1973 | Joosten | 414/498 X |
| 3,799,379 | 3/1974 | Grether | 414/498 X |
| 4,061,237 | 7/1975 | Austin | 414/498 |
| 4,103,795 | 8/1978 | Miller | 414/498 X |

*Primary Examiner*—Trygve M. Blix
*Assistant Examiner*—Terrance L. Siemens
*Attorney, Agent, or Firm*—Williamson, Bains, Moore & Hansen

[57] ABSTRACT

An attachment device for a fork lift and a support structure, such as a truck bed, includes a track on a truck bed. A carriage engages and is movable along the track. The carriage engaging member is mounted on the lift frame of the fork lift and is engageable with the carriage to permit the fork lift to lift itself upon the truck bed or lower itself therefrom by vertical shifting of the fork lift frame.

8 Claims, 6 Drawing Figures

ATTACHMENT DEVICE FOR A FORK LIFT

SUMMARY OF THE INVENTION

This invention relates to fork lift vehicles and more particularly to an attachment device for elevating the fork lift upon an elevated support structure.

Fork lifts are used extensively as industrial handling vehicles including the transfer of loads to and from trucks. However, some industrial sites do not have loading docks so that the truck to be loaded or unloaded has its bed or floor located substantially above the ground surface. This situation makes loading and unloading of the truck with a fork lift virtually impossible.

It is therefore a general object of this invention to provide an attachment device for a fork lift which permits the latter to raise and lower itself with respect to an elevated support structure, such as a truck bed.

More specifically, it is an object of this invention to provide a fork lift vehicle with an attachment on its lift frame which is engageable with a carriage mounted on a track secured to the bed of a truck whereby the fork lift vehicle may readily elevate itself upon the truck bed or lower itself therefrom by vertically shifting its lift frame.

These and other objects and advantages of this invention will more fully appear from the following description made in connection with the accompanying drawings, where like reference characters refer to the same or similar parts throughout the several views.

FIGURES OF THE DRAWINGS

PREFERRED EMBODIMENT OF THE INVENTION

Figure 1:
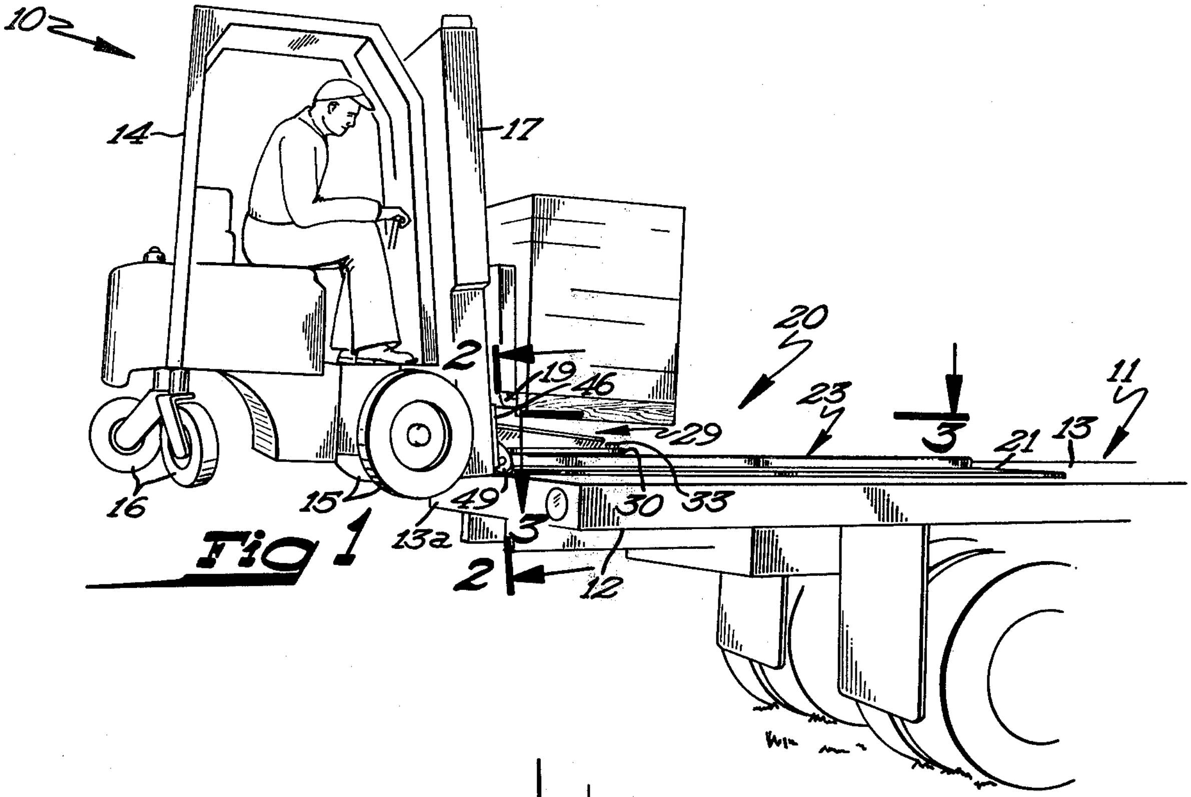
FIG. 1 is a perspective illustrating the rear portion of a truck bed and a fork lift vehicle incorporating the novel invention.

Referring now to the drawings and more particularly to FIG. 1, it will be seen that a fork lift 10 is mounted upon a truck 11 and having a bed 12. Truck bed or floor 12 is of conventional construction and has an upper flat surface 13 and a substantially straight transversely extending rear edge 13*a*. Typically, trucks to be loaded or unloaded are backed against a loading dock so that the rear edge is adjacent the edge of a loading dock and the upper surface 13 of the bed is substantially continuous with the upper surface of the loading dock.

The fork lift 10 includes a conventional body 14 having driven ground wheels 15, rear castor wheels 16 and vertically disposed, fixed frame 17 at its front end. A lift frame 18 is vertically shiftable on the fixed frame and is provided with horizontally projecting lifting tines 19. The power means for vertically shifting the lift frame 18 relative to the fixed frame 17 is not shown but comprises the conventional hydraulic power means normally employed in fork lifts.

Figure 3:
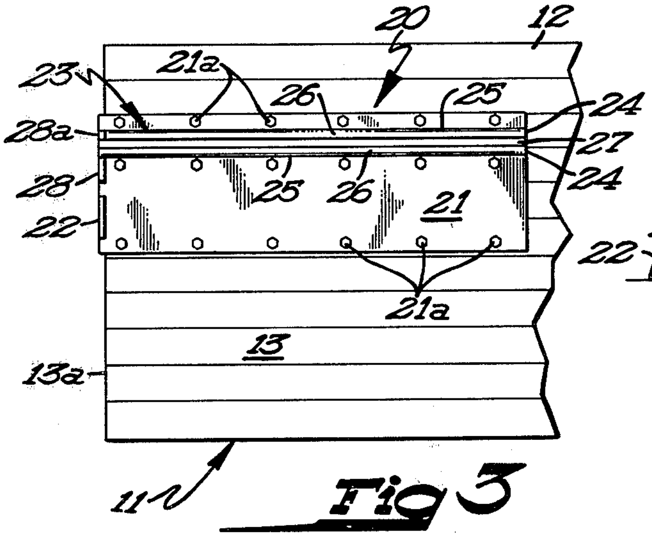
FIG. 3 is a top plan view taken approximately along line 3—3 of FIG. 1 and looking in the direction of the arrows.
Figure 4:
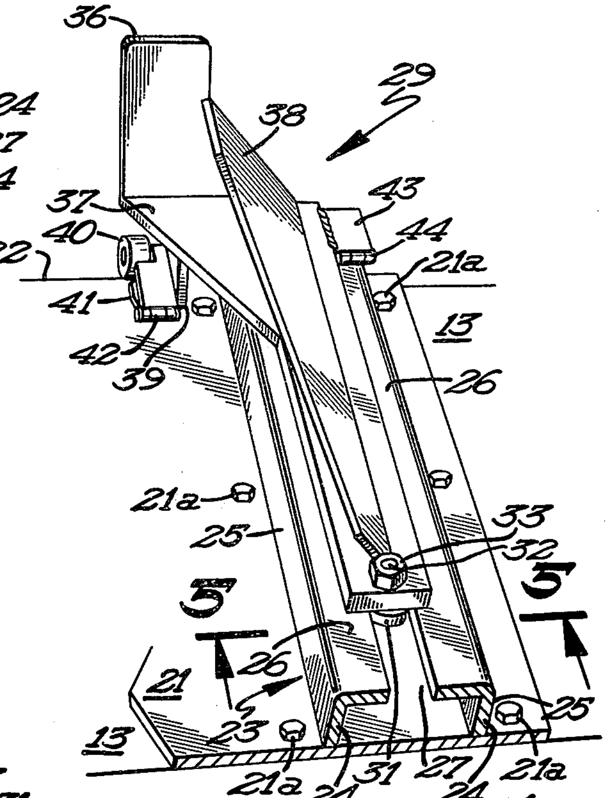
FIG. 4 is a front perspective view illustrating the track and carriage components of the present invention.

An attachment device 20 is provided and is operable to permit the fork lift to be raised or lowered with respect to the bed 12 of the truck 11 by utilizing the lifting action of the lift frame 18 of the fork lift. This attachment device 20 includes a substantially rectangular flat plate 21 as best seen in FIG. 3 which is secured to the upper surface 13 or the bed 12 by bolts 21*a*. It will be noted that the plate 21 extends in a fore and aft direction with respect to the bed 12 and has its rear edge positioned in substantially vertical coplanar relation with respect to the rear edge 13*a* of the truck bed.

An elongate track 23 is secured to the plate 21 and extends from the rear edge thereof to the front edge of the plate. The truck 23 is comprised of a pair of substantially identical elongate angles 24 each including a vertical flange 25 secured to the upper surface of the plate 21 as by welding and a horizontal flange 26 which is disposed substantially parallel to the plate. It will be noted that the horizontal flanges 26 are laterally spaced apart to define an elongate space 27 therebetween.

An elongate carriage 29 is mounted on the track 23 for longitudinal fore and aft movement therealong. Rearward movement of the carriage is limited by a stop element 28 which projects upwardly from the rear edge of the plate 21 and a stop element 28*a* which projects upwardly from the track 23. The carriage 29 includes an elongate substantially flat straight support 30 having a guide roller 31 secured thereto by a bolt 32 to which is secured a nut 33. It will be noted that the bolt 32 serves as an axle whereby the roller 31 is revolvable about a vertical axis. The guide roller 31 is positioned within the space 27 and is adapted to rollably engage the edges of the horizontal flanges 26.

Figure 5:
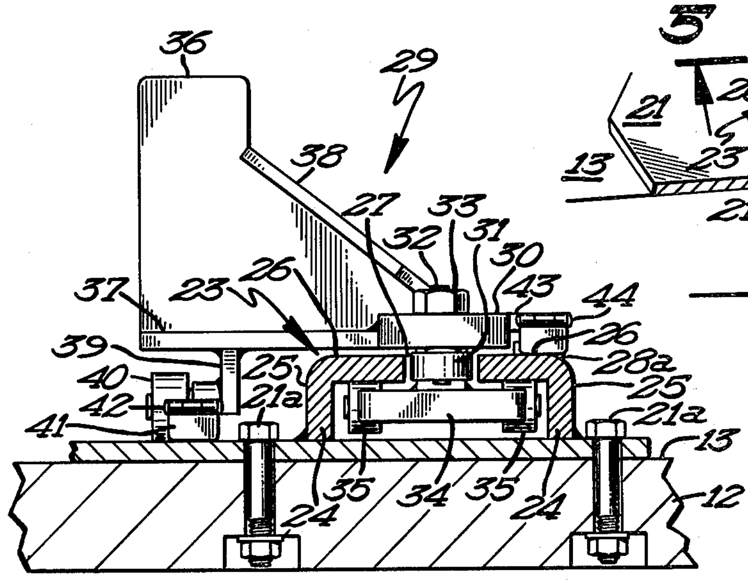
FIG. 5 is a cross-sectional view taken approximately along line 5—5 of FIG. 4 and looking in the direction of the arrows.
Figure 6:
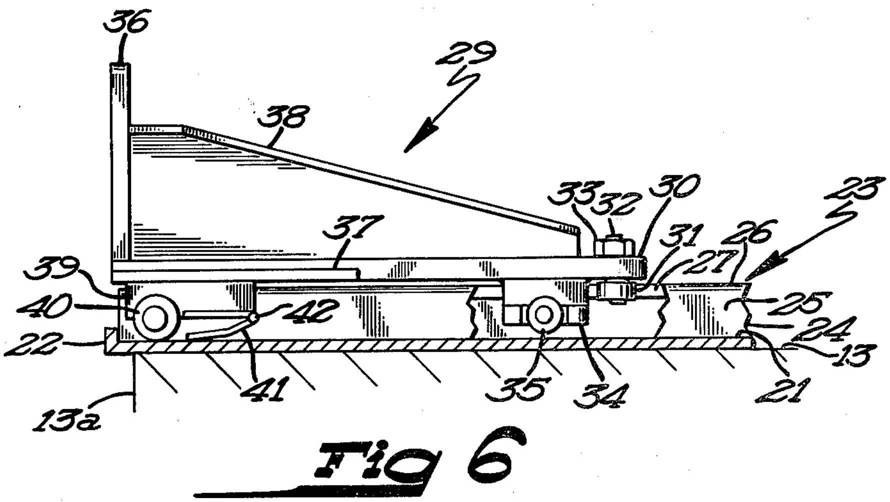
FIG. 6 is a side elevational view of the track and carriage components of the present invention with certain parts thereof broken away for clarity.

A T-shaped bracket 24 is secured to the lower surface of the elongate support 30 and depends therefrom, as best seen in FIGS. 5 and 6. The bracket 34 has a pair of rollers 35 journaled thereon which engage the lower surfaces of the horizontal flanges 26.

The carriage also includes a vertical tongue or plate 36 which projects vertically from one side of the support 30 adjacent the rear end thereof. The tongue 36 is integral with the horizontal gusset or plate 37 which is rigidly affixed to the elongate support 30. An elongate incline gusset or plate 38 is also affixed to the tongue 36 and is rigidly affixed to the upper surface of the support 30 along substantially the major portion of the length of the latter.

An L-shaped bracket 39 is rigidly affixed to the lower surface of the horizontal gusset 37 and the bracket has a roller 40 journal thereon for rotation relative thereto. The roller 40 is disposed in rolling engagement with the upper surface of the plate 21 and serves to support a lateral portion of the carriage 29. A substantially flat generally rectangular shaped stop-engaging element 41 is hingedly secured by a hinge 42 to a plate bracket integral with the L-shaped bracket 39. Another stop-engaging element 43 is hingedly connected by hinge 44 to one longitudinal edge of the support 30 adjacent the rear end portion thereof. It will be seen that the stop-engaging elements 41 and 43 are adapted to respectively engage the stop elements 28 and 28*a* upon rearward movement of the carriage 29.

Figure 2:
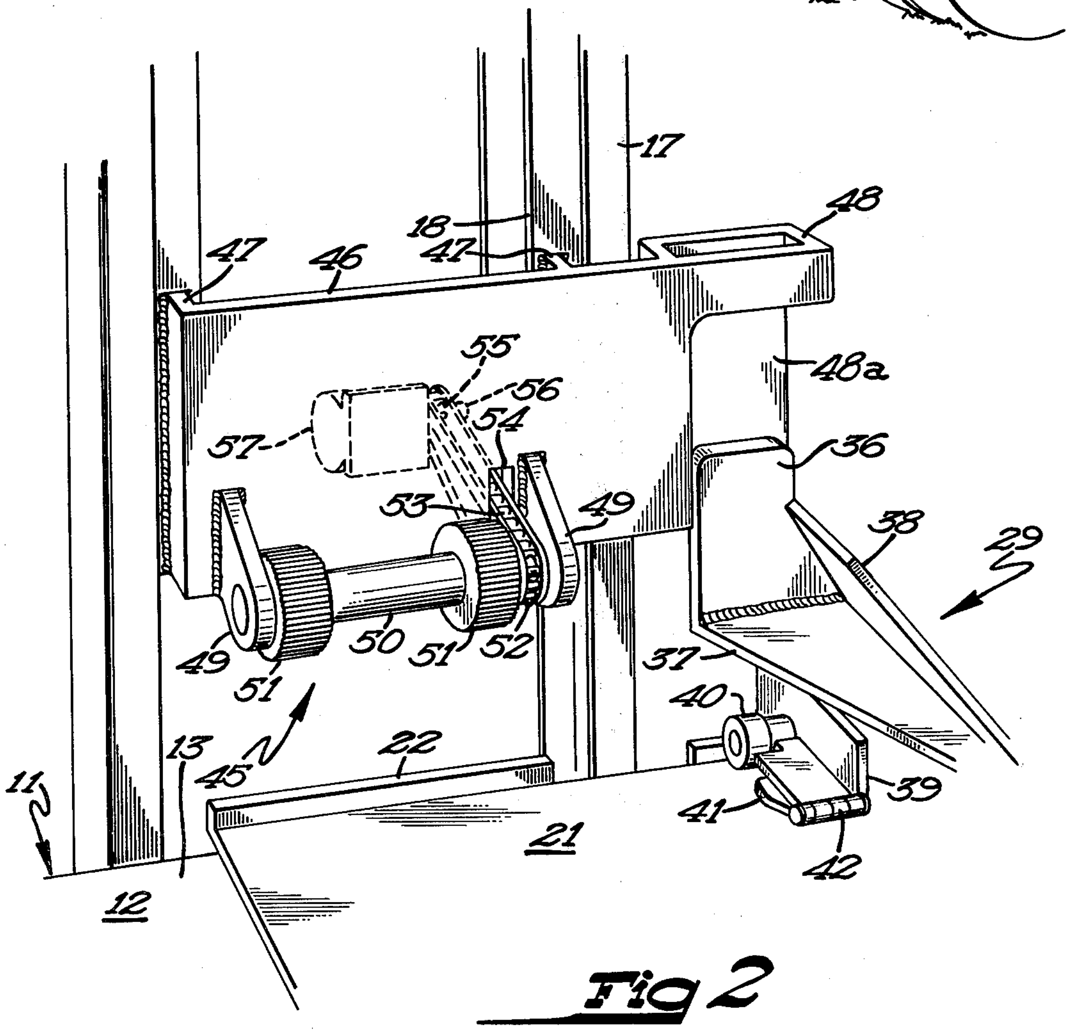
FIG. 2 is a perspective view taken approximately along lines 2—2 of FIG. 1 and looking in the direction of the arrows.

A carriage engaging member 45 is secured to the lift frame 18 of the fork lift and is vertically shiftable therewith. The carriage engaging member includes a vertically disposed substantially rectangular plate 46 having rearwardly projecting flanges 47 integral therewith, the flanges being welded or otherwise secured to the lift frame 18. An annular carriage engaging element 48 is integrally formed with the plate 46 adjacent one side thereof, as best seen in FIG. 2. It will be noted that the rear wall element of the annular carriage engaging element includes a downwardly extending portion 48*a* which serves as a guide for facilitating engagement of the carriage engaging element with the tongue 36 of the carriage 29.

The plate 46 is provided with a pair of laterally spaced apart forwardly projecting bracket plates 49, as best seen in FIG. 2, each having an opening therein for accommodating the ends of a shaft 50 therein. The shaft 50 is journal for rotation relative to the bracket plates and has a pair of gear wheels 51 affixed thereto adjacent opposite end portions thereof. A driven sprocket 52 is also affixed to one end portion of the shaft 50 for rotation therewith, as best seen in FIG. 2.

An elongate endless chain 53 is trained about the driven sprocket 52 and projects through an opening 54 in the plate 46 and is trained about a drive sprocket 55. The drive sprocket 55 is keyed or otherwise affixed to an output shaft 56 of a reversible rotary hydraulic motor 57 which is secured or mounted to the rear surface of the plate 46.

In operation, the fork lift 10 may be used to load or unload trucks, such as the truck 11. For example, if it is desirable to load the truck with boxes, cartons or the like, the box or carton will be supported on the lifting tines of the fork lift and the fork lift will be driven to a point adjacent the rear edge 13*a* of the truck bed 12. The lift frame 18 will be elevated so that the carriage engaging member 45 is positioned above the tongue 46. The fork lift will be driven slightly forward to vertically align the carriage engaging element 48 with the tongue 36, and the lift frame will be lowered thereby lowering the carriage engaging member. The lift frame 18 will continue to be lowered until the annular carriage engaging element 48 engages the tongue and the gear wheels 51 engage the upper surface of the plate 21. The hydraulic motor will be energized to rotate the gear wheels in a direction to impel the fork lift forwardly along the plate 21. The fork lift will be moved forwardly along the plate by the gear wheels 51 until the fork lift is supported by the ground engaging wheels 15 and the castor wheels 16. When this occurs, the lift frame will be lifted to disengage the carriage engaging element 48 with respect to the tongue 36, and the load will be deposited at the proper position on the truck bed 12.

The fork lift will then be manipulated until the annular carriage engaging element 48 again engages the plate 46 and the fork lift will be moved rearwardly until it clears the rear edge of the truck bed. It is pointed out that in this rearward movement of the carriage 29, the stop-engaging elements 41 and 43 will engage the stop elements 28 and 28*a* to limit rearward movement of the carriage. The fork lift will be lowered until it is supported upon the ground surface by the ground engaging wheels 15 and the castor wheels 16, and the lift frame will be lifted to disengage the carriage engaging element 48 from the tongue 36.

From the foregoing, it will be seen that I have provided a novel attachment device which permits fork lift vehicles to be readily elevated to and from an elevated support surface such as the truck bed of a truck. With this arrangement, trucks and other vehicles may be unloaded even though there is no loading dock which is substantially coplanar with a vehicle floor or bed.

Thus it will be seen that I have provided a novel devide for fork lifts, which is not only of simple and inexpensive construction, but an attachment device which increases the utility of fork lift vehicles.

What is claimed is:

1. An attachment device for a fork lift and a support structure, such as a truck bed, having an elevated flat upper surface and having a rear edge, the fork lift including a body having ground engaging wheels, a fixed frame on the front of the body, a vertically shiftable lift frame on the fixed frame movable between raised and lowered portions, an elongated track on the elevated support surface, a carriage engaging said track and being movable therealong, a carriage-engaging member mounted on the lift frame and being vertically movable therewith, said carriage-engaging member being engageable with the carriage when the lift frame and carriage-engaging member are shifted vertically downwardly from a raised portion, whereby the fork lift upon further downward shifting movement of the lift frame the fork lift will be elevated and supported by the carriage so that the ground engaging wheels will be positioned at the same level as the elevated upper surface, and means on said carriage-engaging member engaging the upper support surface and impelling the fork lift along said upper support surface until the ground engaging wheels are supported on the support surface.

2. The attachment device as defined in claim 1 and a plate mounted on the elevated support surface, said track being mounted on said plate.

3. The attachment device as defined in claim 1 wherein said means on said carriage member for compelling the fork lift along the elevated support surface comprises toothed wheels, and a power mechanism for driving said toothed wheels.

4. The attachment device as defined in claim 1 wherein said track has one end thereof disposed adjacent the rear edge of said support surface.

5. The attachment device as defined in claim 1 wherein said carriage is provided with rollers having revolving contact with said track.

6. The attachment device as defined in claim 4 and stop means on said track for limiting longitudinal movement of said carriage along said track in a direction towards the rear edge of said support surface.

7. The attachment device as defined in claim 1 wherein said carriage-engaging member is provided with an annular carriage-engaging element for releasably engaging said carriage.

8. The attachment device as defined in claim 7 wherein said carriage includes an upstanding tongue adjacent one end thereof, and said carriage-engaging element engages said tongue when the fork lift is supported by the carriage.

* * * * *